United States Patent
Tegel

(10) Patent No.: US 10,508,670 B2
(45) Date of Patent: Dec. 17, 2019

(54) STRUCTURAL MEMBER AND JOINT

(71) Applicant: Robert Tegel, Huntley, IL (US)

(72) Inventor: Robert Tegel, Huntley, IL (US)

(73) Assignee: Robert G. Tegel, Huntley, IL (US)

( * ) Notice: Subject to any disclaimer, the term of this patent is extended or adjusted under 35 U.S.C. 154(b) by 397 days.

(21) Appl. No.: 15/360,213

(22) Filed: Nov. 23, 2016

(65) Prior Publication Data

US 2017/0146042 A1 May 25, 2017

Related U.S. Application Data

(60) Provisional application No. 62/258,791, filed on Nov. 23, 2015.

(51) Int. Cl.
*F16B 7/18* (2006.01)
*F16B 7/04* (2006.01)

(52) U.S. Cl.
CPC .............. *F16B 7/0446* (2013.01); *F16B 7/18* (2013.01)

(58) Field of Classification Search
CPC ...... F16B 7/00; F16B 7/02; F16B 7/04; F16B 7/0406; F16B 7/044; F16B 7/0446; F16B 7/0486; F16B 7/0493; F16B 7/18; F16B 7/182; F16B 7/025; F16B 7/1472; F16B 2200/403; F16B 13/04; F16B 21/073; Y10T 403/4309; Y10T 403/7003; Y10T 403/7194
USPC ......................................... 403/207, 347, 400
See application file for complete search history.

(56) References Cited

U.S. PATENT DOCUMENTS

| | | | | |
|---|---|---|---|---|
| 4,900,058 | A * | 2/1990 | Hobrecht | B60R 21/13 280/756 |
| 5,078,534 | A * | 1/1992 | White | F16B 7/042 403/292 |
| 6,134,939 | A * | 10/2000 | Sofy | B21D 43/055 198/621.1 |
| 6,543,956 | B2 * | 4/2003 | Schwarzbich | F16B 5/0233 403/167 |
| 7,731,446 | B2 * | 6/2010 | Prause | B60N 2/1615 403/164 |
| 2013/0029792 | A1 * | 1/2013 | Abdelmalek | A63B 60/00 473/513 |

FOREIGN PATENT DOCUMENTS

DE 2063413 B * 12/1971 ............ F16B 7/0493

* cited by examiner

*Primary Examiner* — Daniel J Wiley

(57) ABSTRACT

An alternative connection element to a permanent structural connection, with the ability to be disassembled or reconfigured. The apparatus and method creates a stable compression and tension connection of structural elements that provides a fixed connection but allows for dis-assembly and use of dissimilar materials and finishes. The connection includes a first bore through a primary structural element and a tension bore extending inwardly from a surface of the primary element intersecting the first bore. A compression bore extends inwardly from an opposite surface of the primary element. A secondary element is received in the first bore, and receives a tension element through the tension bore, aperture, and compression bore. A compression element is operably connected to the tension element so that the compression element and tension element are operable to urge the secondary element in abutment with an inner surface of the first bore.

18 Claims, 5 Drawing Sheets

STRUCTURAL MEMBER AND JOINT

CROSS-REFERENCE TO RELATED APPLICATION

This application claims the benefit of priority of U.S. provisional application No. 62/258,791, filed Nov. 23, 2015, the contents of which are herein incorporated by reference.

BACKGROUND OF THE INVENTION

The present invention relates to structural members and more particularly to removable joints to securely connect structural members. When joining two pieces of structural tube members to erect a structure the connection can be unstable using only a bolt and lock-nut unless the connection is permanently joint or by welding. If the joint is welded, this makes the structural joint non-replaceable and difficult dis-assemble for replacement of components or to transport. As such, current methods of joining structural tubing with nuts and bolts can be unstable or loose and may need to be welded or permanently fixed in order to make them stable.

As can be seen, there is a need for an improved structural joining apparatus to provide secure, yet readily removable joints, to facilitate disassembly of a structure.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a first structural member 10 that is provided with a compression joint 30 that securely joins the first structural member 10 to one or more adjoining structural members 20 to form a strong and sturdy structure. The method of joining two pieces of structural tube according to the present invention is made stable by the co-intersection of elements and multiple points of contact within the joint 30 and finally by compressive deformation of a tube that essentially eliminate the co-intersecting joint clearances.

This arrangement provides both joint failure redundancy modes and stability within the joint 30 and imparts strength to the resultant structure, while still allowing the constructed structure to be disassembled and removed for easy transport, reconfiguration or replacement. Redundancy is created by the construction such that if a single element fails the remaining elements limit the degrees of freedom of movement or disconnection of the elements. The connection is near the strength of a fixed connection but still allows for dis-assembly. The connection method allows for dissimilar materials, finishes and textures to be joined into a non-permanent reconfigurable structure.

Figure 1:
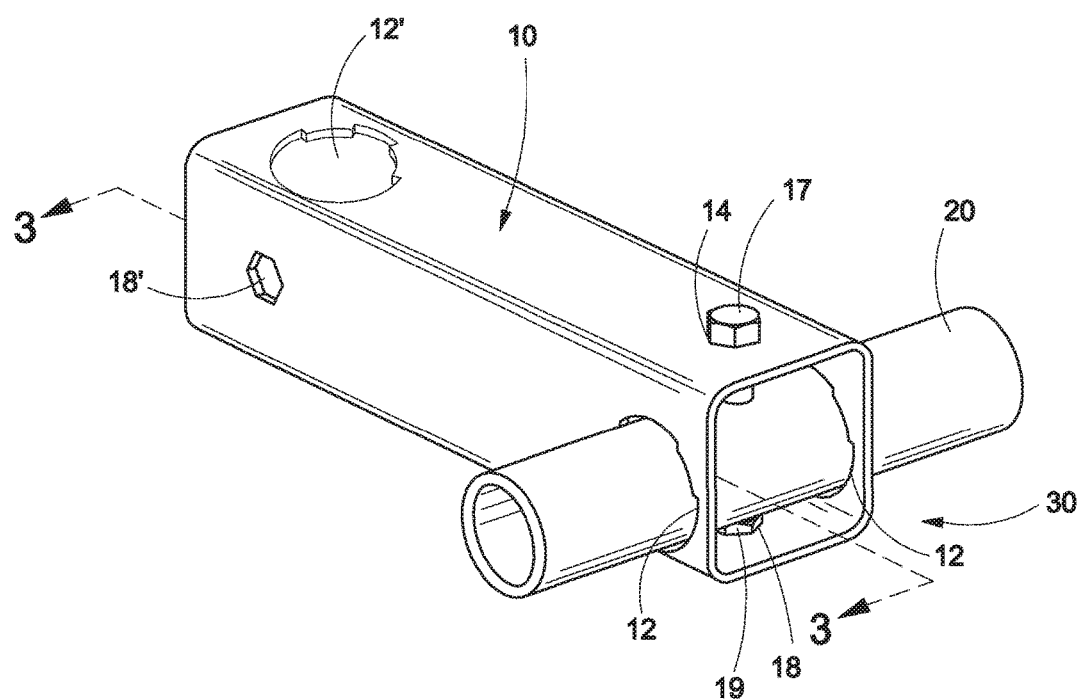
FIG. 1 is a perspective view of an embodiment of a joining apparatus.

As seen in reference to FIG. 1, a jointed structural member according to the present invention comprises a primary element 10, a tension element, a compression element, and a secondary element. The primary element 10 preferably comprises an elongate tubular member, though in certain embodiments, a solid structural member would also be suitable. In the embodiment depicted, the tubular member 10 is shown as a square tube, however, the tube may also be formed in any suitable geometric cross sectional shape, such as an ellipsoid, an octagon, a hexagon, a rectangle, and the like.

The primary element 10 may be of any length selected for the particular application of the primary element 10 as a structural member for a desired structure. The primary element 10 comprises at least one joint structure. The co-intersecting joint structure comprises a first bore 12 extending through the side of the primary element 10 and across a transverse dimension of the primary element 10. The joint structure 30 may be defined at any location along the length of the primary element 10. In the embodiment depicted, the first bore 12 is shown substantially perpendicular to a longitudinal axis of the primary element 10. As will be appreciated, the bore 12 may be defined at angles other than perpendicular, depending on a desired angle of orientation between the primary element 10 and the secondary element 20, such as may be needed in forming a canopy, arched roof structure, and the like. The first bore 12 will have a shape corresponding to the cross sectional shape of the secondary element 20.

Figure 2:
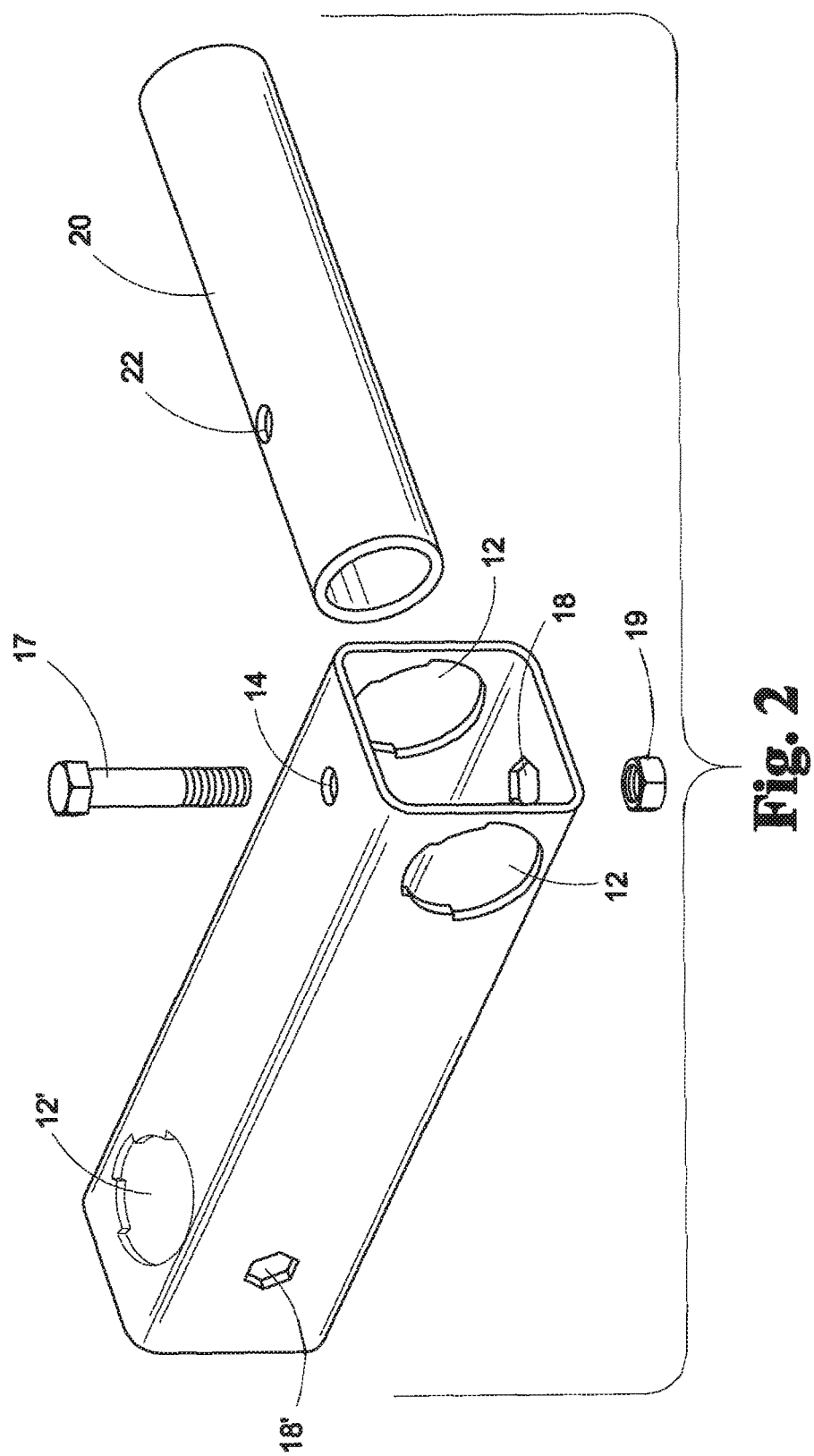
FIG. 2 is an exploded perspective view of a joining apparatus.
Figure 3:
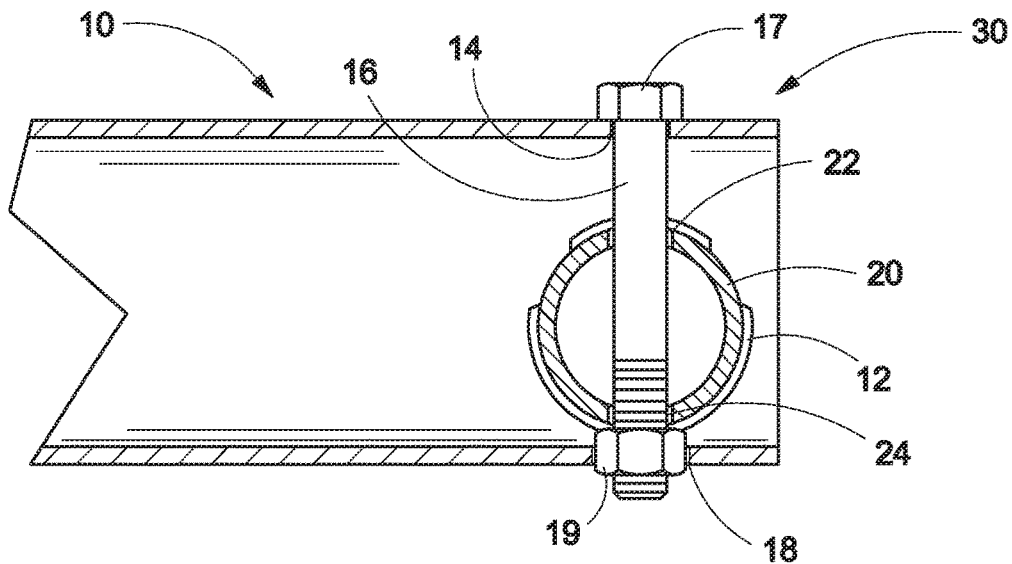
FIG. 3 is a partial cross sectional view of a joining apparatus taken along line 3-3 of FIG. 1.

As best seen in reference to FIGS. 2 and 3, the joint structure 30 further comprises a second, or tension bore 14 extending through a side of the primary element 10, across a second transverse dimension of the of the primary element 10. Preferably, the tension bore 14 is defined to be substantially perpendicular to a longitudinal axis of the secondary element 20 received through the first bore. The tension bore 14 is defined so as to intersect the first bore, more preferably through the axis of the first bore 12.

The tension bore 14 is adapted to receive a shaft 16 of the tension element 16 there through. In the embodiment depicted, the tension element 16 may be a bolt, having a head portion 17, an elongate shaft, and threads defined along at least a portion of the shaft 16. The head portion 17 is dimensioned so that it is greater than the diameter of the tension bore 14. Preferably, the head portion 17 is provided with a holding means so as to prevent rotation of the head, or alternatively as a tightening means for the tension member 16. The means may be any of a number of conventional bolt heads, such as an external hex, internal hex (Allen), Torx, slotted, Phillips, carriage, or a tension element that pulls the joints into a compressive state. Tension member may be in the form of a perishable element, like a rivet. Alternately, the joint may employ a compressive fastener 24 that seats the joint, such as a Rivnut, manufactured by Cardinal Components Inc, Menomonee Falls, Wis.

The joint structure 30 further comprises a third, or compression bore 18, that is coaxially aligned with the tension bore 14. As with the tension bore 14, the compression bore 18 is oriented to intersect the first bore 12. The compression bore 18 is dimensioned to receive the compression element 19 therein, for abutment of the compression element 19 with a side surface of the secondary element 20. Optionally, the compression bore 18 is shaped to receive the compression element 19 so as to allow axial movement within the bore 18, while restricting radial movement or rotation within the bore 18. The compression element 19, may comprise any conventional nut, such as a hex, wingnut, acorn nut, and the like. Alternately the compressive element 19 may be a rivet, or similar compression holding fastener. The compression element 19 may further include a self-locking nut, or further comprise a lock washer and the like. The compressive element may take a simplified form of a positioned nut 19 in secondary element 20 and screw that imparts force to seat the joint. This method allows for primary element 10 to be perpendicularly adjustable to secondary element 20.

The secondary element 20 comprises an aperture 22 defined through a transverse dimension of the secondary element 20. The aperture 22, is defined so that it will be substantially aligned with the axis of the tension 14 and compression bores 18 so that the tension element 16 may be received through the aperture 22.

Figure 4:
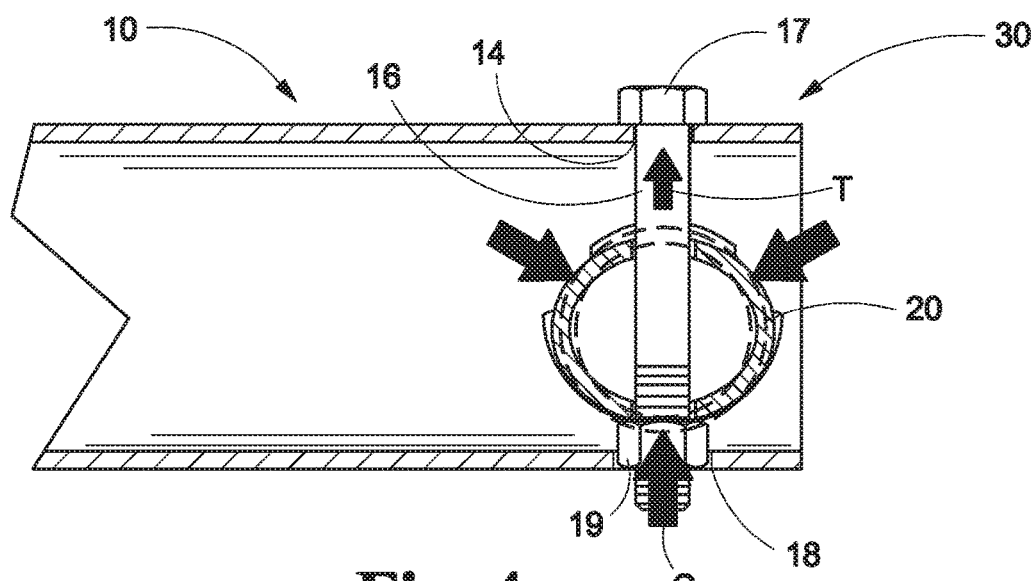
FIG. 4 is a partial cross sectional view of the joining apparatus with joining forces applied.

As best seen in FIGS. 3 & 4, an embodiment of the joint structure 30 according to the present invention, is depicted in a modified cross sectional view, to present an understanding of the operation. As depicted the secondary element 20 is received in the first bore 12 of the primary element 10, and oriented perpendicular to the longitudinal axis of the primary element 10. The tension element 16 is received through the tension bore 14 and, in this embodiment, extends through the compression bore 18. The compression element 19 is received in the compression bore 18 and threadingly receives the tension element 16. The shapes of compression element 19 and compression bore 18 match for the purpose of requiring one tool to tighten the joint. The compression bore 18 could alternately be a shape to receive variations or a shape required for variations of a tool to place the joint in compression.

Figure 4A:
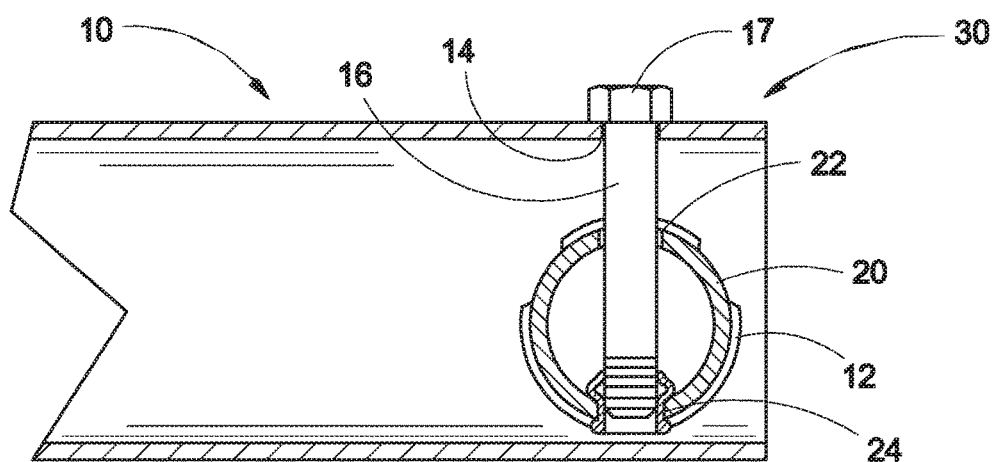
FIG. 4A is a partial cross sectional view of an alternative embodiment of the joining apparatus with joining forces applied.
Figure 5:
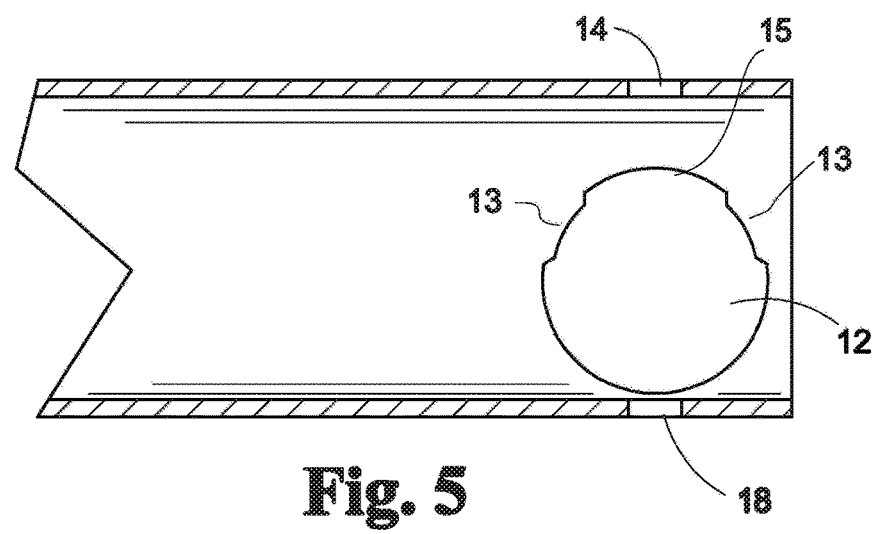
FIG. 5 is a cross sectional view of an end of a first structural member according to aspects of the invention.
Figure 6A:
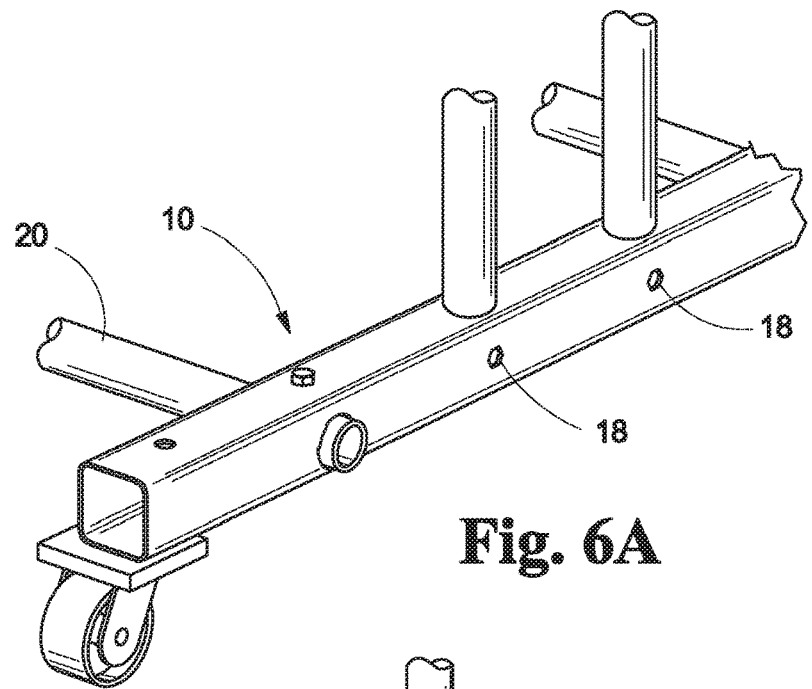
FIG. 6A depicts a representative configuration of a structure that may be formed with the joining apparatus of the present invention.
Figure 6B:
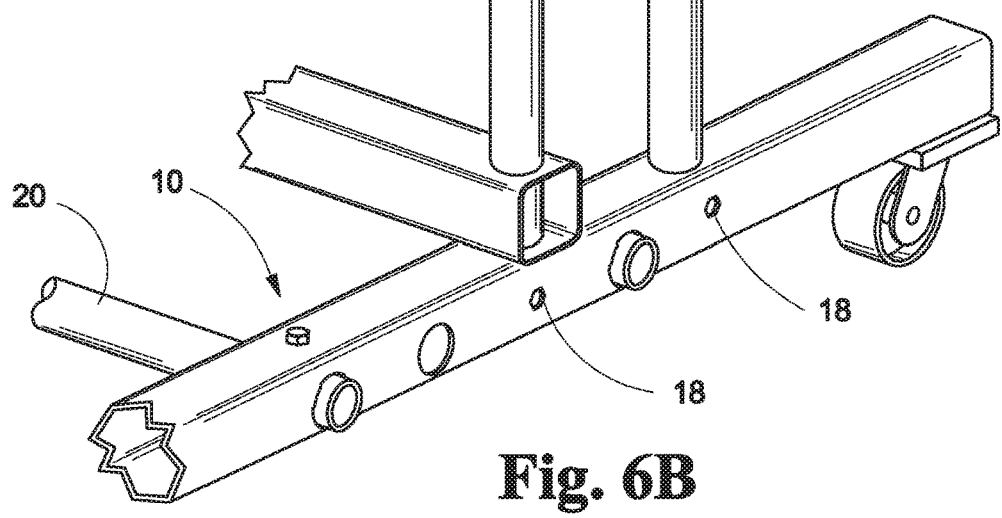
FIG. 6B depicts an alternative representative configuration of a structure that may be formed with the joining apparatus of the present invention.

The secondary element 20 may have an integral compression element 19, one that may be inserted into aperture 22. The compression element 19 may be a modification of aperture 22, such as a threaded aperture in the secondary element 20 that eliminates compression element 19. Alternately, the joint may employ a compressive fastener 24 that seats the joint, such as a Rivnut. See FIG. 4A.

As the tension element 16 is rotated, such as with a wrench, the compression element 19 exerts a force on the side surface 24 of the secondary element 20. The force exerted by the compression element 19 urges the secondary element 20 against the wall of the first bore 12 proximal to the tension bore 14. In a preferred embodiment, the wall of the first bore 12 will have a pair of lobes 13 that extend inwardly along a minor arc of the first bore 12 on either side of and proximal to the tension bore 14. A notch 15 is defined along the minor arc between the first lobe and the second lobe.

As seen in reference to FIG. 4, as the tension 16 and compression 19 elements are tightened, the circumferential aspects of secondary element 20 distort from its original uncompressed state (depicted by the dashed lines), to a compressed state (depicted the solid lines). As the secondary element 20 distorts its outer wall 24 is pressed against lobes 13 extending from the inner surface of the first bore 12 to and the secondary element 20 elongates to impinge against the sidewall of the first bore subjacent to the lobes 13 to form a tight fitting joint between the primary element 10 and the secondary element 20. As will be appreciated, the foregoing elements, when working in cooperation form a stable high strength connection while still allowing the items to be disassembled for shipment or replacement.

In reference back to FIG. 1, the primary element 10 may be provided with a plurality of joint structures 30' to accommodate the reception and joining with additional secondary elements 20'. Each of the joint structures may be defined with the same orientation for the secondary elements 20', or each may have a different orientation, depending upon the requirements of a particular application.

This method of connecting structural tube members can be used to make structures stronger and more stable. There are few limits as to what can be fabricated using this method. It can be used for all types of structural fabrications, and making frames for such structures. It can create: Stands, Work Benches, Tools, and Carts.

It should be understood, of course, that the foregoing relates to exemplary embodiments of the invention and that modifications may be made without departing from the spirit and scope of the invention as set forth in the following claims.

What is claimed is:

1. A joint for joining structural elements, comprising:
a primary element, formed as an elongate member;
a first bore extending transversely through opposing sides of said elongate member;
a tension bore extending inwardly from a surface of said primary element and intersecting said first bore; and
a compression bore, defined coaxial with said tension bore extending inwardly from an opposite surface of said primary element and intersecting said first bore;
a secondary element adapted to be received in said first bore, said secondary element having an aperture defined through a transverse dimension thereof and substantially coaxial with said tension bore and said compression bore;
a tension element, adapted to be received through said tension bore, aperture, and said compression bore: and
a compression element, operably connected to said tension element, wherein said compression element and said tension element are operable to urge said secondary element in abutment with an inner surface of said first bore.

2. The joint of claim 1, further comprising:
a pair of lobes extending inwardly from the inner surface of the first bore.

3. The joint of claim 2, wherein the lobes extend inwardly along a minor arc of the first bore on either side of and proximal to the tension bore.

4. The joint of claim 3, wherein a notch is defined interposed between the lobes.

5. The joint of claim 3, wherein the compression element is a nut.

6. The joint of claim 3, wherein the compression bore is shaped to receive a lateral side of the nut in a holding abutment.

7. The joint of claim 3, wherein the compression element is a threaded bore insert received in the compression bore.

8. The joint of claim 3, wherein the compression element is a threaded aperture defined in a sidewall of the secondary element.

9. A structural joint, comprising:
a primary element, having a first bore extending through a transverse dimension of the primary element from a first side to an opposite side of the primary element;
a tension bore defined into the primary element and intersecting said first bore; and
a compression bore, defined coaxial with said tension bore extends inwardly from an opposite surface of said primary element to intersect the first bore opposite the tension bore;
a secondary element having an aperture defined through a transverse dimension thereof and substantially coaxial with said tension bore and said compression bore when the secondary element is received in said first bore;
a tension element, adapted to be received through said tension bore into said compression bore; and
a compression element, configured for connection to said tension element, wherein said compression element and said tension element are operable to urge said secondary element in abutment with an inner surface of said first bore.

10. The joint of claim 9, further comprising:
a pair of lobes extending inwardly from the inner surface of the first bore.

11. The joint of claim 10, wherein the lobes extend inwardly along a minor arc of the first bore on either side of and proximal to the tension bore.

12. The joint of claim 10, wherein a notch is defined interposed between the lobes.

13. The joint of claim 9, wherein the compression element is a nut.

14. The joint of claim 9, wherein the compression bore is shaped to receive a lateral side of the nut in a holding abutment.

15. The joint of claim 9, wherein the compression element is a threaded bore insert received in the compression bore.

16. The joint of claim 9, wherein the compression element is a threaded aperture defined in a sidewall of the secondary element.

17. A method of joining structural elements, comprising:
providing a primary element, having:
a first bore extending transversely through opposing sides of the elongate member,
a tension bore defined into said primary element to intersect said first bore, and
a compression bore, defined coaxial with said tension bore extending inwardly from an opposite surface of said primary element to intersect said first bore;
inserting a secondary element through the first bore, the secondary element having an aperture defined through a transverse dimension thereof and substantially coaxial with said tension bore and said compression bore when inserted into the first bore;
inserting a tension element through said tension bore to extend into said compression bore;
applying a compression element to said tension element; and
tightening said compression element with said tension element to urge said secondary element in abutment with an inner surface of said first bore.

18. The method of claim 17, wherein a pair of lobes extend inwardly from the inner surface of the first bore and the secondary element is urged against the lobes.

* * * * *